United States Patent Office 3,575,947
Patented Apr. 20, 1971

3,575,947
CYCLIC OLEFIN CONVERSION
Donald L. Crain, Bartlesville, Okla., assignor to
Phillips Petroleum Company
No Drawing. Continuation-in-part of application Ser. No. 517,932, Jan. 3, 1966. This application Nov. 21, 1968, Ser. No. 777,916
Int. Cl. C08f 7/02
U.S. Cl. 260—93.1                                    14 Claims

ABSTRACT OF THE DISCLOSURE

Cyclic olefinic hydrocarbons including mono- and polyenes are converted into polyunsaturated hydrocarbons of higher molecular weight by contacting the olefin with a catalyst active for the disproportionation of acyclic olefins having three or more carbon atoms into other olefins of both higher and lower molecular weight.

This is a continuation-in-part application of Ser. No. 517,932, filed Jan. 3, 1966, now abandoned.

This invention relates to higher molecular weight polyunsaturated materials and a method for their preparation. In one aspect it relates to the preparation of resinous polymeric materials. In another aspect, it relates to the production of high molecular weight materials resulting from the hydrogenation of high molecular weight polyunsaturated materials. In a further aspect, the invention relates to the reaction of cyclic olefins in the presence of an olefin disproportionation catalyst. In a preferred aspect, it relates to the reaction of a nonconjugated cyclic polyolefinic compound in the presence of an olefin disproportionation catalyst. In another preferred aspect, it relates to the reaction of cyclic monoolefins in the presence of an olefin disproportionation catalyst.

For convenience, the term "olefin" or "olefinic compound" when used in this specification and claims refers to a hydrocarbon compound containing one or more olefinic carbon to carbon double bonds. Similarly, the terms "cyclic olefin" or "cyclic olefinic compound" refer to an olefin as defined above which has as its basic structure one or more alicyclic rings, all the double bonds of the olefin being located in the ring structure, and "cyclic polyene" refers to such a cyclic olefin which has at least two olefinic double bonds. It is understood however that the olefins and cyclic olefins as defined above can have substituent groups located on the molecule.

According to the process of this invention cyclic olefins are converted to compounds having a polyunsaturated structure with a higher molecular weight than the starting cyclic olefin by reaction of said cyclic olefins in the presence of an olefin disproportionation catalyst. Also, according to this invention the higher molecular weight polyunsaturated product obtained is hydrogenated to produce a saturated or partially saturated compound.

It is an object of this invention to provide a process for the conversion of cyclic olefins to higher molecular weight compounds having a polyunsaturated structure. Another object of this invention is to provide a process for preparing resinous polymers. Still another object of this invention is to produce a solid hydrogenated material resulting from the hydrogenation of higher molecular weight polyunsaturated compounds.

Other aspects, objects and advantages of this invention will be apparent to those skilled in the art upon studying the disclosure including a detailed description of the invention.

The preferred cyclic olefin compounds which can be converted to higher molecular weight polyunsaturated compounds by the process of the invention include those having from 4 to about 12 carbon atoms in any one ring, from 1–4 double bonds in a ring, and 0–10 substituent alkyl groups, each containing from 1 to about 4 carbon atoms per radical or 0–2 substituent aryl, alkaryl, or aralkyl groups, such that the total number of carbon atoms per molecule does not exceed 20. It is preferred that the cyclic olefin compounds employed contain no branching at at least one of the double bonds. Mixtures of these compounds may also be employed in the process of the invention.

It is also preferred that when cyclic olefins are employed which contain more than one double bond, the double bond arrangement be nonconjugated. Additionally, it is preferred to employ monocyclic monoolefins.

Some specific examples of compounds which can be employed are:

(1) Cyclic olefins having more than one ring such as bicyclo[2.2.1]heptene - 2 (2 - norbornene), bicyclo[2.2.1]hepta - 2,5 - diene (norbornadiene), bicyclo[3.2.1]oct-2-ene, spiro[4.4]non-2-ene, and bicyclo[3.3.0]oct-2-ene, and the like;

(2) Alkyl, aryl, aralkyl, and alkaryl substituted cyclic olefins such as 3-methylcyclopentene, 4-ethylcyclohexene, 5 - n - propylcyclooctene, 3,3,5,5-tetramethylcyclononene, 3,4,5,6,7 - pentaethylcyclodecene, 2 - methyl - 6 - ethylcyclooctadiene - 1,4, 3 - phenylcyclooctene, 3-benzylcyclooctene, 4-(3-methylphenyl)cyclonone, and the like;

(3) Conjugated and nonconjugated cyclic olefins containing two or more double bonds such as 1,5-cyclooctadiene, 1,5,9 - cyclododecatriene, 1,4,7,10-cyclododecatetraene, 1,4 - cyclooctadiene, 1,5 - cyclononadiene, 1,5-cyclodecadiene, 1,3 - cyclodecadiene, 1,3 - cyclooctadiene, 2-methyl-6-ethylcyclooctadiene-1,4, and the like.

(4) Unsubstituted monocyclic monoolefins such as cyclobutene, cyclopentene, cyclohexene, cycloheptene, cyclooctene, cyclononene, cyclodecene, cycloundecene, cyclododecene, and the like.

It is to be understood that the foregoing exemplary list of compounds which can be employed as starting materials in the process of converting these materials to higher molecular weight polyunsaturated products is not limited to the above-recited compounds. It is apparent that the invention is applicable to cyclic olefins having more than one ring which has alkyl, aryl, aralkyl, or alkaryl substituents. The invention is also applicable to substituted monocyclic olefins such as 4-ethylcyclohexene, 5 - n - propylcyclooctene, 3-methylcyclopentene, and the like. It is likewise apparent from the above disclosure that alkyl, aryl, alkaryl, aralkyl substituted conjugated and nonconjugated cyclic olefins can be employed in the practice of the invention. For the sake of brevity, however, an exhaustive list of these various combinations of compounds has not been included as it will be apparent to one skilled in the art the applicable compounds which are used in accordance with the invention.

The catalysts which are suitable for carrying out the conversion of the present invention are any of those which show activity for disproportionating acyclic olefins having 3 or more carbon atoms into other olefins of both higher and lower molecular weight. Some examples of such catalysts are those which comprise or are prepared from such materials as oxides of molybdenum, tungsten, and rhenium, and hexacarbonyls and sulfides of tungsten and molybdenum. These catalytic promoters are generally associated with catalytic support materials such as silica, alumina, silica-alumina, magnesia-titania, thoria, aluminum phosphate and zirconium phosphate. The catalytic agents are the reaction products resulting from the admixture, under activating conditions, of such promoter materials and such support materials. Other inert materials can also be present in the catalyst composition in minor amounts. In addition, the catalyst can contain minor amounts of some materials which, in some instances, exert a beneficial effect on the process. Such materials can include cobalt oxide and alkaline substances as compounds of the alkali and alkaline earth metals.

Preferably, the promoter materials and support materials which are admixed to produce the catalytic agents are combined as follows:

(1) Silica or thoria promoted by an oxide, or a compound convertible to the oxide by calcination, of tungsten, molybdenum, rhenium, or tellurium, or by a sulfide of tungsten or molybdenum;

(2) Alumina promoted by an oxide, or compound convertible to an oxide by calcination, of molybdenum or tungsten; by a sulfide of tungsten or molybdenum; or by an alkali metal salt, ammonium salt, alkaline earth metal salt, or bismuth salt of phosphomolybdic acid;

(3) One or more of the group aluminum phosphate, zirconium phosphate, calcium phosphate, magnesium phosphate, or titanium phosphate promoted by one or more of a sulfide of molybdenum or tungsten, or by an oxide or a compound convertible to an oxide by calcination of molybdenum, tungsten, or rhenium or by magnesium tungstate or by beryllium phosphotungstate; and (4) Silica, alumina, aluminum phosphate, zirconium phosphate, calcium phosphate, magnesium phosphate, or titanium phosphate promoted by rhenium oxide or a hexacarbonyl of molybdenum, rhenium, or tungsten.

Some suitable catalysts are disclosed in U.S. Ser. No. 94,996, Banks, filed Mar. 13, 1961; Ser. No. 312,209, Banks, filed Sept. 27, 1963, now Pat. No. 3,261,879, issued July 19, 1966; Ser. No. 509,146, Heckelsberg, filed Nov. 22, 1965, now Pat. No. 3,365,513, issued Jan. 23, 1968; and Ser. No. 336,624, Heckelsberg, filed Jan. 1, 1964, now Pat. No. 3,340,322, issued Sept. 5, 1967. Some specific examples of suitable catalysts include cobalt molybdate on alumina, and tungsten oxide on silica, alumina or silica-alumina.

My invention is not limited to the use of a specific disproportionation catalyst but any catalyst suitable for disproportionation of acyclic olefins can be utilized.

The above-described catalysts generally contain from about 0.1 to about 30 weight percent of the promoter material based on the total composite. The catalyst can be prepared and activated by conventional means. For example, a catalytic grade alumina gel can be impregnated with an aqueous solution of ammonium molybdate. Drying and calcining to temperatures of about 1100° F. complete the catalyst preparation. In a similar manner, a silica gel can be impregnated with ammonium metatungstate, dried and calcined. Tungsten sulfide can be ball-milled with thoria followed by heating in an inert gas such as nitrogen at 800–1400° F. A precalcined silica-alumina can be impregnated with a solution of molybdenum hexacarbonyl in a nonaqueous solvent such as benzene and then directly used in a liquid phase reaction. Optionally, this impregnated solid can be dried and heated at temperatures of up to 1000° F. in an inert atmosphere to form the catalyst.

The finished catalyst can be in the form of powder, or granules as well as in other shapes such as agglomerates, pellets, spheres, extrudates, and beads, depending upon the type of contacting technique which utilizes the catalyst.

A cyclic olefinic hydrocarbon or a mixture of cyclic olefinic hydrocarbons can be polymerized according to the process of this invention to produce higher molecular weight polymers having a polyunsaturated structure. The conditions of temperature and pressure for the polymerization reaction are those conditions at which the catalyst composite shows activity for disproportionating acylic olefins having three or more carbon atoms into other olefins of both higher and lower molecular weight. The process can be carried out by contacting one or more cyclic olefins with an olefin disproportionation catalyst at pressures of 0 to 2000 pounds per square inch gage (p.s.i.g.) or higher for periods of 0.1 second to 24 hours or more. When using the catalysts of (1), the reaction temperatures are in the range of about 400 to about 1100° F.; when using the catalysts of (2), in the range of about 150 to 500° F.; when using the catalysts of (3), in the range of about 600 to 1200° F.; when using the catalysts of (4), in the range of about 0 to 600° F.

Thus, the conversion can be carried out at temperatures which can range from about 0 to 1200° F. depending upon the specific catalyst utilized. For example, a molybdenum hexacarbonyl can be utilized at temperatures of 0 to 600° F.; molybdenum oxide on alumina can be utilized at temperatures of 150 to 500° F.; tungsten oxide on silica gel is generally utilized at 400 to 1100° F.; and tungsten oxide on aluminum phosphate is generally utilized at 600 to 1200° F. It is generally preferred to utilize a low conversion rate, below 50 percent for example, and more preferably below 25 percent to avoid production of undesirable quantities of unwanted by-products. However, if heavy polymeric products are desired, higher conversions can be used.

The process of this invention can be carried out in the presence or absence of an inert diluent, with the amount of diluent generally ranging from 0 to 90 percent by volume of the reaction mixture. Suitable diluents include saturated hydrocarbons such as alkanes and cycloalkanes and mixtures thereof. For ease of product recovery, the particular diluent chosen will depend on the particular cyclic olefin feedstock to be used and the degree of conversion, that is, the molecular weight of the resulting product.

The process can be carried out batchwise or as a continuous process. In a batch process, the catalyst will generally comprise from about 0.5 to about 25 percent by weight of the reaction mixture. When operating on a continuous basis, the catalyst can be employed as a fixed bed over which cyclic olefin feedstock and recycled material is passed at a suitable rate to obtain the desired conversion at the chosen reaction conditions. One particularly suitable method for effecting the conversion is to employ a suitable vessel or kettle, which can be heated, having a catalyst chamber attached thereto in a position above the vessel. The feed is then placed in the vessel and heated. Vapors rise through the catalyst bed and are converted to the product. Since the product will be higher boiling than the feed it will be in the liquid phase and will return to the heated vessel. Any vapors which pass from the top of the catalyst bed can be condensed and returned to the top of said bed as reflux.

As a preferred embodiment, the catalyst can also be treated with an inorganic base to deactivate any acid sites present in the catalyst. Treatment with base minimizes competing reactions such as double bond isomerization. Typical inorganic bases which can be employed in this base treatment include the alkali and alkaline earth metal hydroxides, including the hydroxides of sodium, potassium, rubidium, lithium, cesium, calcium, strontium, and barium. The preferred bases, if base treatment is to be used, are sodium hydroxide and potassium hydroxide. The amount of adduct base can vary over a wide range, but if used will generally range from 0.01 to 5 weight percent of the promoted catalyst composite, preferably from 0.5 to 2 weight percent on the same basis. A molybdena-alumina catalyst treated with KOH is presently a preferred catalyst. Other preferred catalysts include rhenium oxide-alumina and tungsten oxide-silica.

In the present invention the conversion of the cyclic olefin starting materials can be described in terms of the following exemplary equation although the invention is not limited by any particular theory of operation:

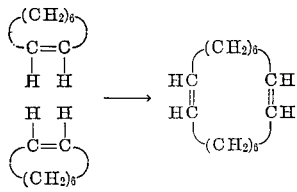

Thus, when cyclooctene, for example, is subjected to the process of the invention, the primary product is 1,9-cyclohexadecadiene. This diene can further react with another molecule of cyclooctene to form 1,9,17-cyclotetraeicosatriene or with itself to form a cyclic tetraene, etc. Other starting materials such as cyclic dienes, trienes, and tetraenes follow a similar course to produce higher molecular weight polyunsaturated cyclic products containing, in general, the same ratio of double bonds to carbon atoms as the starting material. Depending upon the specific catalyst and conditions, some migration of double bonds in the product can also take place. The higher molecular weight products of this invention can include both liquids and resinous solids. Accordingly, it is clear that the process of the invention can provide cyclic polyunsaturated products of higher molecular weight, although the process of the invention is not limited thereto. Accordingly, the products of the invention can contain substantial amounts of acyclic molecules.

The cyclic polyunsaturated products of this invention are useful for a variety of purposes. For example, the double bonds in the higher molecular weight product can be reacted with such reactants as halogens, hydrogen peroxide, etc., to form materials useful as insecticides, plasticizers and the like. The products themselves, if carried to high molecular weight, can be used in much the same manner as other polymers in that they are useful as coatings and for the molding of various items such as tires, shoe soles, and other rubbery items. The double bonds present in these cyclic materials also allow cross-linking of the material by methods well known to those skilled in the art.

If desired, the polyunsaturated products of the invention can be hydrogenated by conventional hydrogenation techniques to produce essentially saturated materials. Thus, high molecular weight polymers of this invention can be hydrogenated to saturated materials which can be formed into tough films and other articles.

When converting cyclohexene according to the process of the invention, the extent of the formation of the cyclic polyunsaturated materials is less than with other cyclic olefins. The formation of higher molecular weight material is apparently curtailed by the highly stable six member ring configuration of the cyclohexene molecule. The conversion of cyclohexene can be accompanied, under some conditions, by the formation of the skeletal isomer methylcyclopentene. However, it is to be understood that at least some of the higher molecular weight material is produced when reacting cyclohexene with the catalysts employed in the process of the invention as heretofore disclosed. Accordingly, it is preferred to utilize cyclic olefins having from 4 to 5, and from 7 to 12, carbon atoms in the ring.

The following specific examples clearly illustrate that the process of this invention can be used to convert cyclic olefins to cyclic polyunsaturated materials of much higher molecular weight.

EXAMPLE I

A run was carried out according to the process of this invention wherein cyclooctene was converted to a high molecular weight cyclic polyene.

In this run a distillation column was flushed with nitrogen and charged with 30 grams of a cobalt molybdate on alumina catalyst which contained 3.4 weight percent CoO, 11.0 weight percent $MoO_3$, and 85.6 weight percent $Al_2O_3$. This catalyst was treated with two weight percent potassium hydroxide, after which it was activated in air at 500° C. for 5 hours. A 100 ml. quantity of purified cyclooctene was charged to a 200 ml. kettle of a distillation column and heated to reflux temperature, a kettle temperature of 143° C. The vapors refluxed within the catalyst bed for 6.5 hours after which the liquid in the distillation kettle was cooled and removed. The catalyst was cleaned by refluxing pentane through it for 30 minutes. The pentane was then evaporated from this solution, and the residue remaining was combined with the material originally removed from the kettle.

The combined material was then slowly heated to 90° C. at a pressure of 0.3 mm. mercury absolute pressure to remove the lower boiling components. After one hour at these conditions, the heat was turned off and the vacuum pump was shut down. The Dry Ice trap through which the overhead material passed contained 46 grams of a clear liquid which was shown by gas-liquid chromatography to be cyclooctene except for approximately 5 weight percent of a lower boiling component.

The pot residue from the vacuum distillation was dissolved in approximately 200 ml. of benzene, after which the solution was poured into 500 ml. of acetone. Using slow addition of the solution and stirring, precipitation of a polymeric material occurred. This polymeric material was removed, squeezed dry and then dried in a vacuum oven overnight.

Evaporation of the remaining acetone solution yielded 4 grams of a yellow oil, while the weight of the dry polymer was 10.5 grams.

An infrared spectrum of the polymeric material showed absorption bands at 6.1 microns, 10.5 microns, and 13.7 microns, all of which are consistent with unsaturation. From the intensities of these bands, as compared with cycloocetene, the spectrum is consistent with approximately 1 double bond for 8 carbon atoms. No bands were present which were consistent with a methyl group.

The average molecular weight of polymeric material as determined on an osmometer was 1700. Thus, the average number of carbon atoms was approximately 128, which is equivalent to sixteen $C_8$ units.

Analysis by nuclear magnetic resonance (NMR) showed a ratio of vinylic:allylic:aliphatic protons of 1.9:3.9:8.2. The values for cyclooctene are 2.0:4.0:8.1, thus substantiating the indication given by infrared that there is one double bond for each 8 carbon atoms. In the NMR spectrum, there was no apparent absorption for methyl groups.

EXAMPLE II

Cyclooocetene was converted to polymeric products according to the process of this invention using essentially the same catalyst, equipment, and procedure of Example I.

A 102.7 g. quantity of purified cyclooctene was charged into a distillation pot. The column was charged with 26.8 g. of catalyst in the form of one-quarter inch extruded prills. The distillation pot containing the cyclooctene was heated and the cyclooctene vapors passed into the catalyst-containing column. Vapors passing out of the top of the catalyst bed were condensed and returned to the catalyst bed as reflux. The initial reflux temperature was 145° C. and, after 7 hours, this temperature was 148° C. During this period the liquid in the pot was converted to a yellow viscous material.

After the reaction was terminated, the contents of the distillation pot were evaporated under reduced pressure in a rotating evaporator. A 39.7 g. quantity of unconverted cyclooctene was recovered from the evaporation. The residual syrupy, yellow polymeric product was dissolved in hot cyclohexane and the total volume of the solution was 150 ml. The solid polymer was recovered by slowly adding the polymer solution into a beaker containing 1200 ml. of methanol with rapid agitation. The solvent was decanted from the precipitated polymer which was then dried at 0.2 mm. absolute pressure and at room temperature. The polymer was redissolved in 100 ml. of dry cyclohexane and again precipitated from methanol. The precipitated polymer, somewhat rubbery in nature, was then chopped in a blender in the presence of methanol and dried again at 0.1 mm. A 12.2 g. quantity of dry polymer was recovered.

A 4.1 g. quantity of the polymer was dissolved in 100 ml. of cyclohexane and charged into a 300 ml. autoclave together with 0.3 g. of $PtO_2$ catalyst. The autoclave was sealed, flushed with nitrogen, and then pressured to 50 p.s.i.g. with hydrogen while being heated to 125° C. with stirring. The hydrogen pressure was then increased to 410 p.s.i.g. After 4 hours, the pressure had dropped to 380 p.s.i.g. at which time the autoclave was cooled, the pressure released, and the precipitated polymer separated from the cyclohexane by filtration. The polymer was then dissolved in 150 ml. of chlorobenzene and filtered hot through a heated funnel to separate it from the platinum catalyst. The resulting solution was then poured into methanol. A white powder was obtained which was filtered and dried at 100° C. and at 0.2 mm. A 3.8 g. quantity of dried hydrogenated polymer was recovered.

An elemental analysis showed the polymer to contain 85.4 percent carbon and 14.2 percent hydrogen by weight. Other physical tests showed the polymer to have a tensile strength of 3383 p.s.i., a 107 percent elongation, a 0.85 inherent viscosity in tetralin, and a density of 0.9527.

EXAMPLE III

The compound 1,5-cyclootadiene was polymerized using essentially the same catalyst and apparatus as that described in Example I. After a 4-hour reaction period, the unconverted diolefin was removed by distillation and the pot residue was cooled and poured into methanol. The precipitated polymer was filtered, washed with more methanol, and transferred to a 300 ml. autoclave. The polymer was dissolved in 100 ml. of cyclohexane and 5 ml. of glacial acetic acid. The platinum oxide hydrogenation catalyst was added, the autoclave sealed, and the hydrogenation was carried out at pressures up to about 400 p.s.i.g. and temperatures up to about 130° C. until no further drop in hydrogen pressure was observed. After cooling, the autoclave was opened and the contents diluted with 200 ml. of chlorobenzene. The mixture was boiled until the cyclohexane was evaporated. The solution was decanted from the platinum catalyst and then poured hot into 1000 ml. of methanol. The precipitated polymer was filtered and dried, yielding about 8.5 g. of material. The infrared spectrum of a film made from this hydrogenated polymer was found to be identical with the spectrum of the hydrogenated cyclooctene polymer of the previous example.

EXAMPLE IV

In this example cyclopentene was converted to polymeric products using the present invention process.

A stainless steel fixed bed reactor was charged with 50 ml. (57.5 g.) of a molybdena-alumina catalyst (containing about 12.45 weight percent molybdenum) which had been treated with about 2 weight percent KOH and conventionally activated in air. Cyclopentene was passed through the fixed catalyst bed which was maintained at 120° C. at 150 ml./hour and 125 p.s.i.g. nitrogen pressure. The effluent from the reactor was passed into a stripper pot where the unconverted cyclopentene was volatilized and recycled to the reactor. The polymeric products were allowed to accumulate in the pot. At the end of the 6-hour run, the pot contents were poured into methanol to percipitate the white polymer.

About one-half of this polymer was dissolved in hot chlorobenzene, filtered, and re-precipitated by pouring into methanol. About 3.45 g. of a white, amorphous, rubbery polymer was isolated by this treatment.

The remaining half of the polymer was dissolved in 100 ml. of cyclohexane and hydrogenated in an autoclave at 300 p.s.i.g. using a platinum oxide catalyst and about 5 ml. of acetic acid. The resulting insoluble white polymer was separated from the cyclohexane by decantation, dissolved in hot chlorobenzene, filtered, again precipitated by pouring into methanol, and dried, yielding about 4 grams.

Infrared examination of this hydrogenated polymer sample showed the presence of a methylene chain and some residual unsaturation. The weight aevrage molecular weight was found by ebulliometry to be about 5800.

EXAMPLE V

In this example, cyclohexene was converted using the process of the invention and using a catalyst containing 6.8 weight percent tungsten oxide on a silica support having particle sizes from 30–60 mesh.

Approximately one gram of the tungsten oxide-silica catalyst was placed in the center of a stainless steel tubular reactor and heated at 1000° F. in a stream of dry air for three hours. The remainder of the reactor was filled with steel helixes. Carbon monoxide was then passed through the reactor for 30 minutes at 1000° F. The reactor was allowed to cool to 750° F. under a carbon monoxide blanket. Cyclohexene, previously purified by passage at room temperature through a column of magnesium oxide-silica gel, was passed through the reactor at 300 p.s.i. and 750° F. and at a weight hourly space rate of 203 g./g./hr. The effluent was condensed in two serially connected Dry Ice traps, collected, and analyzed by gas-liquid chromatography. The run was then continued at 860°–900° F. for 12 minutes and a sample collected and analyzed.

The following results were obtained:

| Product | 750° F., wt. percent | 860–900° F., wt. percent |
|---|---|---|
| Methylcyclopentene | 1.78 | 8.01 |
| Benzene | 0.19 | 2.44 |
| Solid polymer | 0.74 | 0.42 |

This example demonstrates that the conversion of cyclohexene results in the production of higher molecular weight material. However, as explained in the specification, one of the products from the conversion of cyclohexene in the presence of a catalyst active for disproportionating acyclic olefins containing 3 or more carbon atoms can be the skeletal isomer, methylcyclopentene.

EXAMPLE VI

In this example, cyclooctene was converted over the tungsten-oxide-silica catalyst of Example V according to the process of the invention. Twenty grams of $WO_3/SiO_2$ prepared in essentially the same manner as the catalyst in Example V was placed in the middle of a tubular stainless steel reactor and heated to 1000° F. in dry flowing air for two hours. The catalyst was then treated with carbon monoxide in accordance with the procedure as explained in Example V.

At reaction conditions of 700° F. and 400 p.s.i.g., cyclooctene was continuously passed through the reactor at a rate of one liquid ml./min. diluted with a stream of nitrogen at about 35 gaseous l./hr. The run continued for 45 minutes. The effluent, containing a thick resinous material, was collected in a Dry Ice-cooled trap and analyzed.

The products formed in the reaction consisted of 51.0 weight percent solid polymeric material, 17.4 weight percent cycloheptene, 16.0 weight percent cyclohexene with the remainder consisting of several unidentified materials mostly lighter than cyclooctene.

This example demonstrates that a $WO_3/SiO_2$ olefin disproportionation catalyst is effective in converting cyclooctene to a polymeric product.

I claim:
1. A process for converting a cyclic olefin having from 4 to about 12 carbon atoms in a ring, from 1–4 double bonds in a ring, and 0–10 substituent alkyl groups, each having from 1 to about 4 carbon atoms or 0–2 substituent aryl, aralkyl, or alkaryl groups, such that the total number of carbon atoms does not exceed 20 to a polyunsaturated hydrocarbon having a higher molecular weight than the cyclic olefin starting material which comprises contacting said cyclic olefin with a catalyst consisting essentially of
   (1) silica or thoria promoted by an oxide of tungsten, molybdenum, rhenium, tellurium, or by a sulfide of tungsten or molybdenum;
   (2) alumina promoted by an oxide of molybdenum, tungsten or rhenium, by a sulfide of tungsten or molybdenum, or by an alkali metal salt, ammonium salt, alkaline earth metal salt, or bismuth salt of phosphomolybdic acid;
   (3) aluminum phosphate, zirconium phosphate, calcium phosphate, magnesium phosphate, or titanium phosphate promoted by one or more of a sulfide of molybdenum or tungsten, by an oxide of molybdenum, tungsten, or rhenium, by magnesium tungstate, or by berylliumphosphotungstate; or
   (4) silica, alumina, aluminum phosphate, zirconium phosphate, magnesium phosphate, calcium phosphate, or titanium phosphate promoted by a hexacarbonyl of molybdenum, rhenium, or tungsten; at a temperature and pressure at which said catalyst shows the activity for disproportionating the acyclic olefins having 3 or more carbon atoms into other olefins of both higher and lower molecular weight.

2. The process of claim 1 wherein said cyclic olefin is a cyclic monoolefin having from 4 to about 12 carbon atoms in the ring, or a nonconjugated cyclic polyene having from 1 to 4 nonconjugated double bonds in the ring, and each of said cyclic monoolefin or said nonconjugated polyene has 0 to 10 substituent alkyl groups each containing from 1 to 4 carbon atoms, such that the total number of carbon atoms per molecule does not exceed 20.

3. The process of claim 1 wherein the catalyst contains from about 0.1 to about 30 percent by weight of the promoter material based on the weight of the composite.

4. The process of claim 3 wherein the catalyst is silica or thoria promoted by an oxide of tungsten, molybdenum, rhenium, tellurium, or a sulfide of tungsten or molybdenum and the reaction is carried out at a temperature range of from about 400 to about 1100° F.

5. The process of claim 3 wherein the catalyst is alumina promoted by an oxide of molybdenum, tungsten, or rhenium, by a sulfide of tungsten or molybdenum, or by an alkali metal salt, ammonium salt, alkaline earth metal salt, or bismuth salt of phosphomolybdic acid and the reaction is carried out at a temperature range of from about 150° to about 500° F.

6. The process of claim 3 wherein the catalyst is aluminum phosphate, zirconium phosphate, calcium phosphate, magnesium phosphate, or titanium phosphate promoted by one or more of a sulfide of molybdenum or tungsten, by an oxide of molybdenum, tungsten, or rhenium, by magnesium tungstate, or by beryllium phosphotungstate and the reaction is carried out at a temperature range of from about 600 to about 1200° F.

7. The process of claim 3 wherein the catalyst is silica, alumina, aluminum phosphate, zirconium phosphate, magnesium phosphate, calcium phosphate, or titanium phosphate promoted by a hexacarbonyl of molybdenum, rhenium or, tungsten and the reaction is carried out at a temperature range of from about 0 to about 600° F.

8. The process for converting a cyclic olefin having from 4 to about 12 carbon atoms in a ring. from 1–4 double bonds in a ring, and 0–10 substituent alkyl groups, each having from 1 to about 4 carbon atoms or 0–2 substituent aryl, aralkyl, or alkaryl groups, such that the total number of carbon atoms does not exceed 20 to a polyunsaturated hydrocarbon having a higher molecular weight than the cyclic olefin starting material which comprises contacting said cyclic olefin with a catalyst consisting essentially of
   (1) silica or thoria promoted by an oxide of tungsten, molybdenum, rhenium, tellurium, or by a sulfide of tungsten or molybdenum;
   (2) alumina promoted by an oxide of molybdenum, tungsten, or rhenium, by a sulfide of tungsten or molybdenum, or by an alkali metal salt, ammonium salt, alkaline earth metal salt, or bismuth salt of phosphomolybdic acid;
   (3) aluminum phosphate, zirconium phosphate, calcium phosphate, magnesium phosphate, or titanium phosphate promoted by one or more of a sulfide of molybdenum or tungsten, by an oxide of molybenum, tungsten, or rhenium, by magnesium tungstate, or by berylliumphosphotungstate; or
   (4) silica, alumina, aluminum phosphate, zirconium phosphate, magnesium phosphate, calcium phosphate, or titanium phosphate promoted by a hexacarbonyl of molybdenum, rhenium, or tungsten; and 0.01 to 5 weight percent based on the weight of the composition of a hydroxide of an alkali metal or an alkaline earth metal, at a temperature and pressure at which said catalyst shows the activity for disproportionating the acrylic olefins having 3 or more carbon atoms into other olefins of both higher and lower molecular weight.

9. The process of claim 8 wherein the hydroxide of an alkali metal or alkaline earth metal is a hydroxide of rhodium, potassium, rubidium, lithium, cesium, calcium, strontium, or barium.

10. The process of claim 2 wherein the cyclic olefin is a cyclic monoolefin having from 4 to 5, and 7–12 carbon atoms in the ring.

11. The process of claim 8 wherein the cyclic olefin is cyclooctene and the catalyst comprises cobalt molybdate supported on alumina, treated with about 2 weight percent potassium hydroxide.

12. The process of claim 8 wherein the olefin is 1,5-cyclooctadiene and the catalyst comprises cobalt molybdate supported on alumina, treated with about 2 weight percent potassium hydroxide.

13. The process of claim 8 wherein the olefin is cyclopentene and the catalyst comprises molybdena supported on alumina, treated with about 2 weight percent potassium hydroxide.

14. A process for converting a cyclic olefin having from 4 to about 12 carbon atoms in a ring, from 1–4 double bonds in a ring, and 0–10 substituent alkyl groups, each having from 1 to about 4 carbon atoms or 0–2 substituent aryl, aralkyl, or alkaryl groups, such that the total number of carbon atoms does not exceed 20 to a polyunsaturated hydrocarbon having a higher molecular weight than the cyclic olefin starting material which comprises contacting said cyclic olefin with a catalyst active for disproportionating acyclic olefins having 3 or more carbon atoms into other olefins of both higher and lower molecular weight comprising
   (1) silica or thoria promoted by an oxide of tungsten, molybdenum, rhenium, tellurium, or by a sulfide of tugnsten or molybdenum;
   (2) alumina promoted by an oxide of rhenium, by a sulfide of tungsten or molybdenum, or by an alkali metal salt, ammonium salt, alkaline earth metal salt, or bismuth salt of phosphomolybdic acid;
   (3) aluminum phosphate, zirconium phosphate, calcium phosphate, magnesium phosphate, or titanium phosphate promoted by one or more of a sulfide of molybdenum or tungsten, by an oxide of molybdenum, tungsten, or rhenium, by magnesium tungstate, or by berylliumphosphotungstate; or (4) silica, alumina, aluminum phosphate, zirconium phosphate, magnesium phosphate, calcium phosphate, or titanium phosphate promoted by a hexacarbonyl of molybdenum, rhenium, or tungsten; at a temperature and pressure at which said catalyst shows the activity for disproportionating acyclic olefins having 3 or more carbon atoms into other olefins of both higher and lower molecular weight.

References Cited

UNITED STATES PATENTS

| 3,062,800 | 11/1962 | Dissen | 260—93.1 |
| 3,074,918 | 1/1963 | Eleuterio | 260—93.1 |

JAMES A. SEIDLECK, Primary Examiner

R. A. GAITHER, Assistant Examiner